US008690111B2

(12) United States Patent  
Huang (10) Patent No.: US 8,690,111 B2
(45) Date of Patent: Apr. 8, 2014

(54) SUSPENDING APPARATUS (76) Inventor: Ming-Hsien Huang, New Taipei (TW)

(*) Notice: Subject to any disclaimer, the term of this patent is extended or adjusted under 35 U.S.C. 154(b) by 0 days.

(21) Appl. No.: 13/603,439

(22) Filed: Sep. 5, 2012

(65) Prior Publication Data

US 2013/0313390 A1    Nov. 28, 2013

(30) Foreign Application Priority Data

May 22, 2012   (TW) .............................. 101209672 U (51) Int. Cl.
    *E04G 3/00*    (2006.01)
(52) U.S. Cl.
    USPC .......................... 248/276.1; 248/371; 248/923
(58) Field of Classification Search
    USPC ......... 248/917, 919, 920, 921, 922, 923, 370, 248/371, 276.1, 282.1, 292.14
    See application file for complete search history.

(56) References Cited

U.S. PATENT DOCUMENTS

| 7,334,766 | B2 * | 2/2008 | Ligertwood | 248/292.13 |
| 7,445,187 | B2 * | 11/2008 | Shin | 248/324 |
| 7,523,907 | B2 * | 4/2009 | Chen | 248/292.12 |
| 7,537,189 | B2 * | 5/2009 | Jung et al. | 248/298.1 |
| 7,731,143 | B2 * | 6/2010 | Muday et al. | 248/284.1 |
| 7,950,613 | B2 * | 5/2011 | Anderson et al. | 248/282.1 |
| 8,235,341 | B2 * | 8/2012 | Taylor | 248/292.14 |
| 2010/0187385 | A1 * | 7/2010 | Luijben et al. | 248/205.1 |

FOREIGN PATENT DOCUMENTS

TW    M296940    9/2006

* cited by examiner

*Primary Examiner* — Steven Marsh  
(74) *Attorney, Agent, or Firm* — Jianq Chyun IP Office (57) ABSTRACT A suspending apparatus is used for suspending an electronic device on a surface. The suspending apparatus includes a base fixed on the surface, a suspending assembly assembled to the electronic device and detachably suspended on the base and having a limiting unit, and a locking assembly configured on the suspending assembly and including a locking unit and a moving unit connected to an end of the locking unit. The locking unit leans upon the limiting unit. In an unlocking process, the moving unit is forced to move along a first path and drives the locking unit. The locking unit unlocks the base with rotating along a second path and moving along a third path while being restricted by the limiting unit, wherein the first and the third paths have an included angle. In a locking process, the locking unit rotates along the second path to lock the base.

18 Claims, 7 Drawing Sheets

SUSPENDING APPARATUS

CROSS-REFERENCE TO RELATED APPLICATION

This application claims the priority benefit of Taiwan application serial no. 101209672, filed on May 22, 2012. The entirety of the above-mentioned patent application is hereby incorporated by reference herein and made a part of this specification.

BACKGROUND OF THE INVENTION

1. Field of the Invention

The invention relates to a suspending apparatus, particularly to a suspending apparatus that suspends an electronic device on a surface.

2. Description of Related Art

For thin monitors such as LCD monitors and plasma monitors, they are usually fixed to walls by a lot of screws or other securing structures to prevent from falling if knocked or bumped. The procedure for assembling or disassembling is without exception complicated and inconvenient.

SUMMARY OF THE INVENTION

The invention provides a suspending apparatus with a structure that is easy and convenient to operate.

The invention provides a suspending apparatus that suspends an electronic device on a surface. The suspending apparatus includes a base, a suspending assembly, and a locking assembly. The base is fixed onto the surface. The suspending assembly is assembled to the electronic device and detachably suspended on the base. The suspending assembly includes a limiting unit. The locking assembly is disposed on the suspending assembly. The locking assembly includes a locking unit and a moving unit. The locking unit leans against the limiting unit. When the suspending assembly is suspended on the base, the locking unit is locked to the base. When the locking unit is unlocked from the base, the suspending assembly is suited to be removed from the base. The moving unit is connected to one end of the locking unit. In an unlocking process, the moving unit is subject to an applied force to move along a first path and drive the locking unit. When the locking unit moves, the locking unit is restricted by the limiting unit and rotates along a second path and moves along a third path so as to be unlocked from the base. The first path and the third path have an included angle. In a locking process, the suspending assembly moves relative to the base such that the locking unit is pressed and released by the base and rotates back along the second path to be locked to the base.

The invention provides a suspending apparatus that suspends an electronic device on a surface. The suspending apparatus includes a base, a suspending assembly, a locking unit and an elastic unit. The base is fixed onto the surface. The suspending assembly is assembled to the electronic device and detachably suspended on the base. The suspending assembly has a first guiding surface and an accommodating space. The locking unit is movably and partially installed in the accommodating space. The locking unit has a locking surface and a second guiding surface adjacent to each other. The second guiding surface is parallel to the first guiding surface. The elastic unit is situated inside the accommodating space and is pressed between the suspending assembly and the locking unit. The elastic unit constantly drives the locking surface to be pressed against the base. When the suspending assembly is removed from the base by an external force, the locking unit moves relative to the suspending assembly and the base by the coordination of the first guiding surface and the second guiding surface, thereby allowing the locking surface to be detached from the base. When the suspending assembly is assembled onto the base by an external force, the base presses against the locking unit, such that, after the locking unit is partially deformed and subsequently restored, the locking surface is pressed against the base.

Based on the above embodiments, the electronic device is suspended on the base via the suspending assembly, and the suspending apparatus has the locking unit that is easily dismantled, wherein a relative motion with a particular movement produced between the limiting unit, the locking unit and the moving unit allows the locking assembly to conveniently and promptly lock or unlock the suspending assembly from the base. Accordingly, the user can conveniently assemble or dismantle the electronic device from the surface via the easy-to-dismantle structure mentioned above.

To clarify and elucidate the above-mentioned features and advantages of the invention, embodiments and their corresponding figures are detailed below.

DESCRIPTION OF EMBODIMENTS

Figure 1:
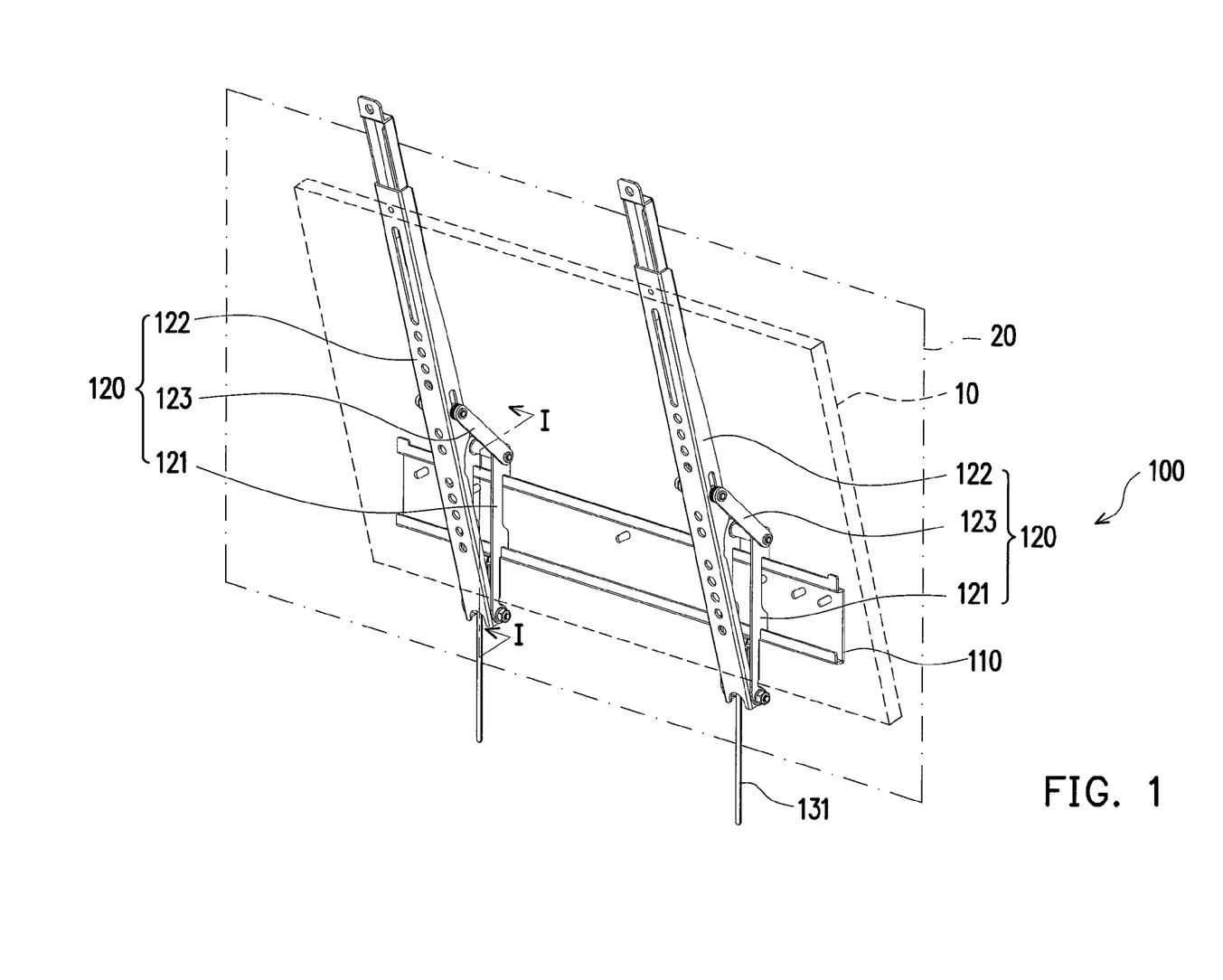
FIG. 1 is a schematic view of a suspending apparatus applied on an electronic device in an embodiment of the invention.

FIG. 1 is a schematic view of a suspending apparatus applied on an electronic device in an embodiment of the invention. Referring to FIG. 1 in this embodiment, an electronic device 10, for example an LCD monitor, is suspended on a wall surface 20, for example but not limited thereto, by a suspending apparatus 100. The suspending apparatus 100 includes a base 110 and two suspending assemblies 120. The base 110 is to be fixed onto the wall surface 20. The suspending assemblies 120 are assembled to the electronic device 10 (for example attaching the electronic device 10 to the suspending assemblies 120 with screws). Furthermore, the suspending assemblies 120 are detachably suspended on the base 110 as shown in FIG. 1. A hanger 121 allows the suspending assemblies 120 to be suspended on or dismantled from the base 110. It must be mentioned that even though FIG. 1 depicts two suspending assemblies 120, the invention is not limited thereto. A user can adjust the number of the suspending assemblies 120 according to the shape, weight, and conditions of use of the electronic device 10.

In this embodiment, each of the suspending assemblies 120 includes a first supporting frame 122 and a second supporting frame 123, which are joined by hinges with the hanger 121 to form a three-bar linkage, wherein the first supporting frame 122 is assembled to the electronic device 10. Moreover, when the electronic device 10 is suspended on the wall surface 20 by the suspending apparatus 100, the three-bar linkage is driven to adjust the position of the first supporting frame 122 relative to the hanger 121, in order to adjust the angle of inclination of the electronic device 10 relative to the wall surface 20, thereby allowing a proper viewing angle for the user.

Figure 2A:
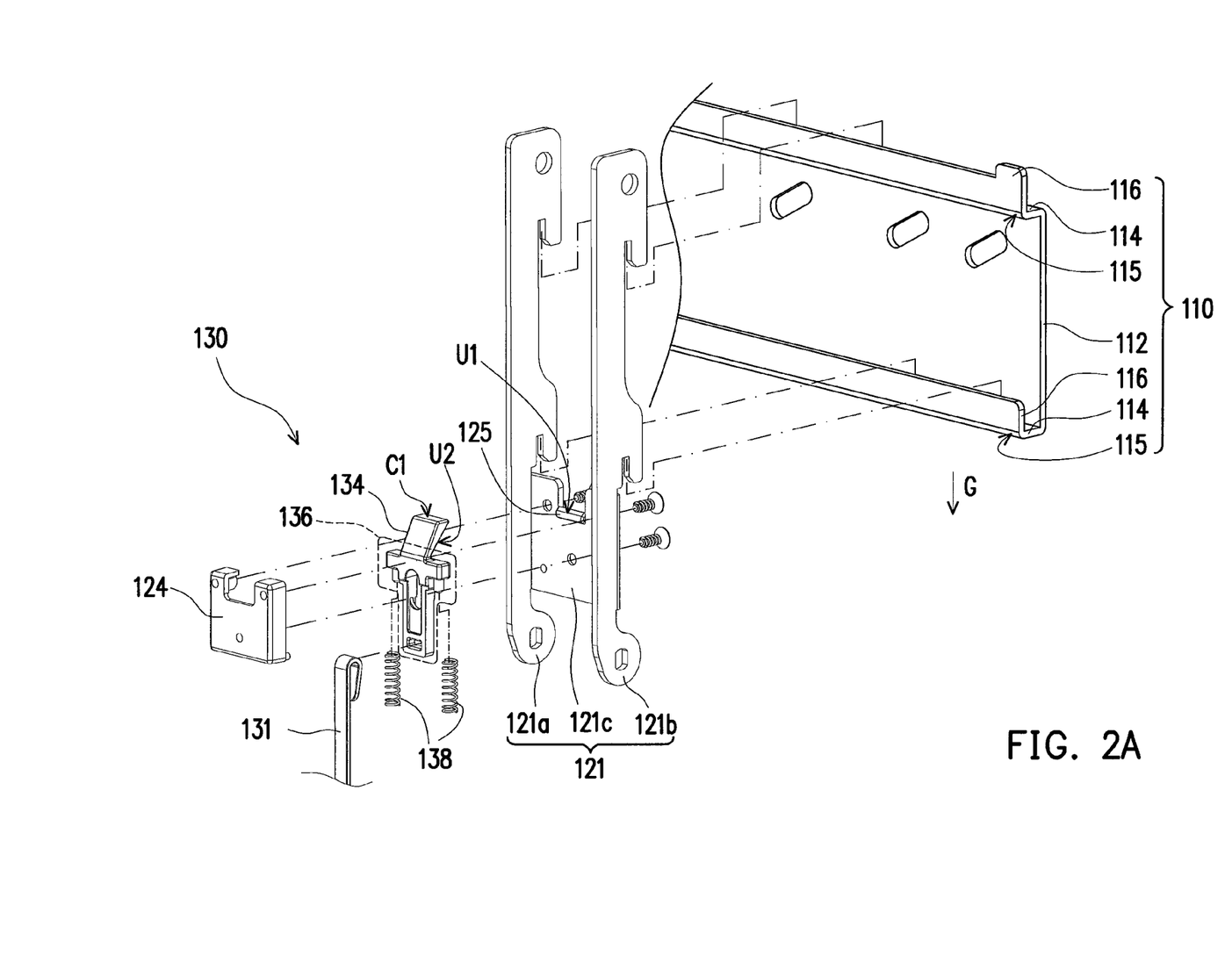
FIG. 2A is a partial exploded view of the suspending apparatus of FIG. 1 at a place of suspension.
Figure 2B:
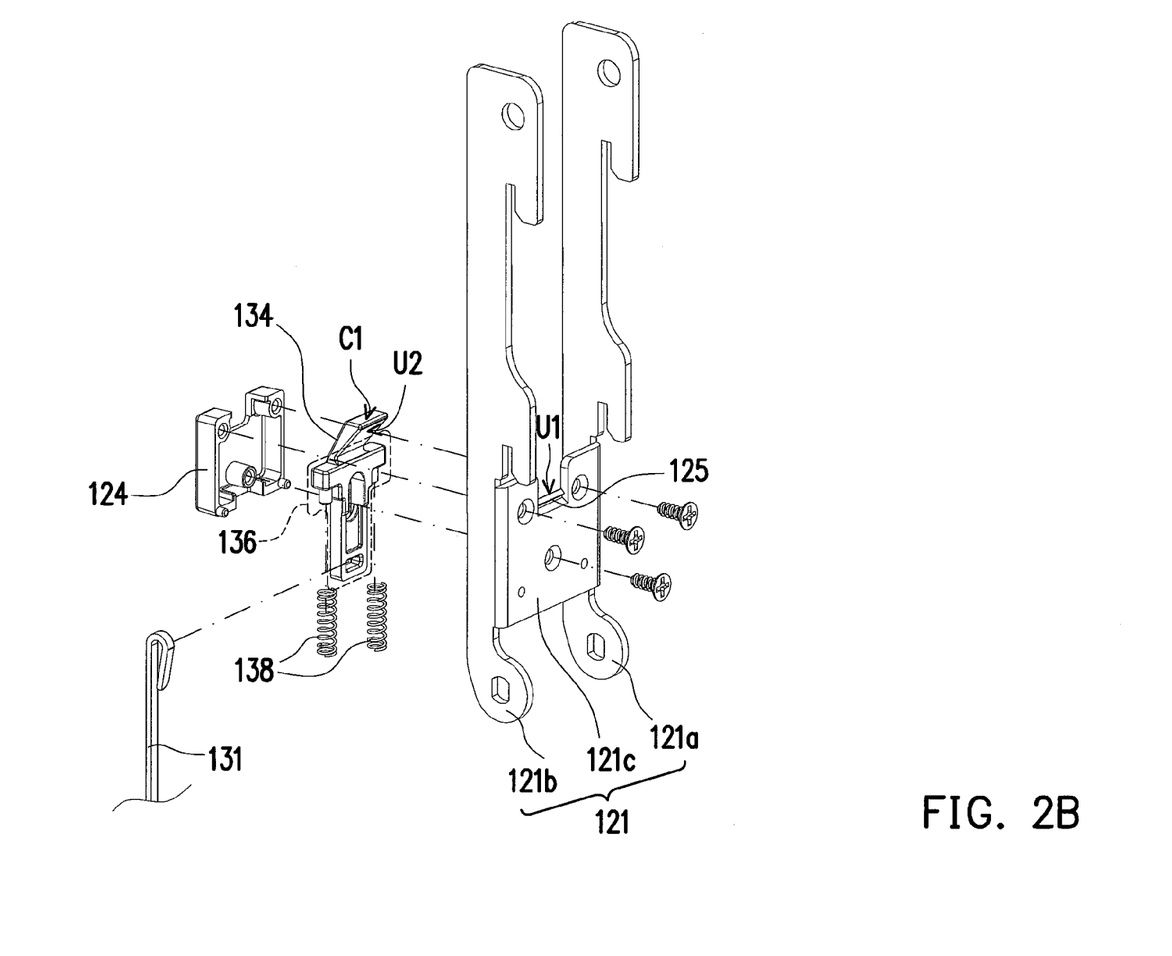
FIG. 2B is a partial exploded view of the suspending apparatus of FIG. 2A from another angle.
Figure 3:
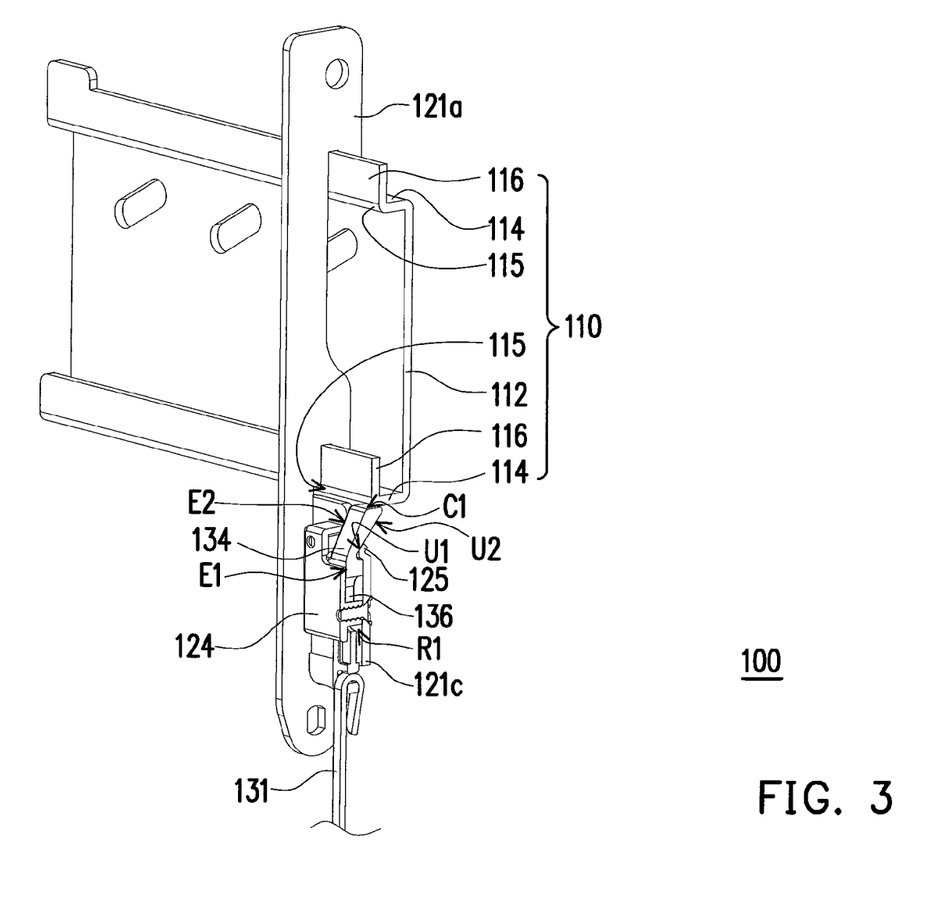
FIG. 3 is a cross-sectional view of the suspending apparatus of FIG. 1 along line I-I.

FIG. 2A is a partial exploded view of the suspending apparatus of FIG. 1. FIG. 2B is a partial exploded view of the suspending apparatus of FIG. 2A from another angle. FIG. 3 is a cross-sectional view of the suspending apparatus of FIG. 1 along line I-I. Referring to FIG. 2A, FIG. 2B, and FIG. 3 in this embodiment, the base 110 has a bearing plate 112, a pair of first slabs 114, a pair of arc-shaped slabs 115 and a pair of second slabs 116. Since the first slabs 114, the arc-shaped slabs 115 and the second slabs 116 are disposed in pairs symmetrically on opposing sides of the bearing plate 112 and have the same structures, and in this embodiment the locking assembly (see below) interacts with the first slab 114, the arc-shaped slab 115 and the second slab 116 shown at the bottom of FIG. 2A and FIG. 3, the following description describes only one set of the first slab 114, arc-shaped slab 115 and second slab 116 shown at the bottom of the figures.

The bearing plate 112 is fixed onto the wall surface 20 (as labeled in FIG. 1). The first slab 114 on the bearing plate 112 extends away from the wall surface 20. The arc-shaped slab 115 is connected to the first slab 114. The second slab 116 extends from the arc-shaped slab 115 in a direction parallel to the wall surface 20. In other words, the part of the first slab 114 furthest away from the second slab 116 is connected to the bearing plate 112. Moreover, the first slab 114 and the second slab 116 belong to different geometrical planes, such that the bearing plate 112, the first slab 114, the arc-shaped slab 115 and the second slab 116 form a slot structure. Furthermore, the hanger 121 includes a pair of hooks 121a and 121b disposed parallel to each other, and a connecting board 121c connected between the hooks 121a and 121b. Based on this configuration, the connecting board 121c of the hanger 121 suspends on the base 110 by means of the hooks 121a and 121b latching onto the slot structure in the direction of gravity G.

Additionally, the suspending assembly 120 also has a limiting unit 125 situated on the connecting board 121c. The limiting unit 125 has a first guiding surface U1. The suspending apparatus 100 also includes a locking assembly 130 disposed on the hanger 121 of the suspending assembly 120. The locking assembly 130 includes a locking unit 134 and a moving unit 136. The locking unit 134 has a second guiding surface U2 movably and selectively coupled to the first guiding surface U1 such that the locking unit 134 selectively leans against the limiting unit 125. For driving the locking unit 134, the moving unit 136 is connected to one end thereof. The motion of the locking unit 134 is restricted by the limiting unit 125 and includes movement and rotation, in order to separate or couple the first guiding surface U1 with the second guiding surface U2. The state of motion of the related structures is described below.

When the electronic device 10 is suspended on the wall surface 20 by the suspending apparatus 100 (as shown in FIG. 1 and FIG. 3), the locking unit 134 is locked onto the base 110, that is, a locking surface C1 of the locking unit 134 is pressed against the first slab 114, the locking surface C1 is adjacent to the second guiding surface U2, and the first guiding surface U1 is coupled with the second guiding surface U2. Therefore, not only can the electronic device 10 be suspended on the wall surface 20 by the suspending apparatus 100, but the electronic device 10 and the suspending assembly 120 attached thereon can also maintain a fixed state relative to the base 100 (and the wall 20) by the interference between the locking unit 134 and the base 110, thereby preventing the electronic device 10 from unexpected moving, for example upwardly relative to the base 110 (and the wall 20), and from accidentally falling off the wall 20 because of impact from an external force.

More importantly, when the electronic device 10 is to be dismounted from the wall surface 20, the locking assembly 130 also serves for fast dismantling.

Furthermore, the suspending assembly 120 of this embodiment further includes a cover 124, which is assembled on the connecting body 121c, for example by screws, and defines an accommodating space R1 therein. The moving unit 136 is movably disposed inside the accommodating space R1. In this embodiment, the direction of motion of the moving unit 136 inside the accommodating space R1 is parallel to the direction of gravity G.

Moreover, the moving unit 136 is attached to the locking unit 134, thereby driving the locking unit 134 to move relative to the limiting unit 125, such that the first guiding surface U1 is separated from the second guiding surface U2, so as to unlock the locking surface C1 of the locking unit 134 from the first slab 114, thereby achieving the effect of removing the electronic device 10 (and the suspending assembly 120 assembled on the electronic device 10) from the base 110. Based on this, the locking assembly 130 of this embodiment takes advantage of the mechanism for fast dismantling between the locking assembly 130 with the suspending assembly 120 and the base 110 to allow the user to rapidly and conveniently dismantle the electronic device 10 from the wall surface 20. The following describes the mechanical procedure of the relevant structures in motion in more detail.

FIG. 4A to FIG. 4F show the suspending apparatus of FIG. 1 in different steps of operation, wherein only one of the hooks 121a is illustrated here.

Figure 4A:
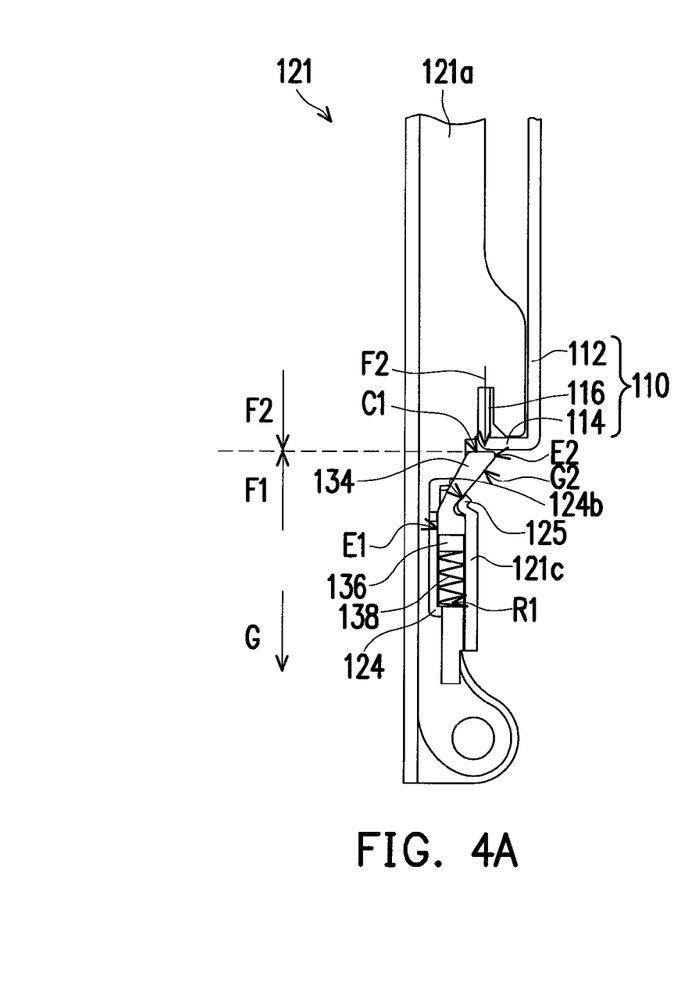
FIG. 4A to FIG. 4F show the suspending apparatus of FIG. 1 in different steps of operation.

Referring to FIG. 4A, the limiting unit 125 and the connecting board 121c of this embodiment are an integral structure. Additionally, the locking unit 134 has a first end E1 and a second end E2 opposite to each other. The first end E1 is connected to the moving unit 136 and is situated inside the accommodating space R1, and makes the locking unit 134 and the moving unit 136 form a single integrated structure. Additionally, the locking unit 134 made of nylon of this embodiment is flexible and elastic, but the material is not limited therein. The locking unit 134 can also be made of other flexible and elastic plastics. The second end E2 protrudes upwards from the accommodating space R1 and presses against the first slab 114 of the base 110. The second end E2 is locked to the first slab 114 of the base 110 by the locking surface C1. The second guiding surface U2 is situated between the first end E1 and the second end E2.

Figure 4B:
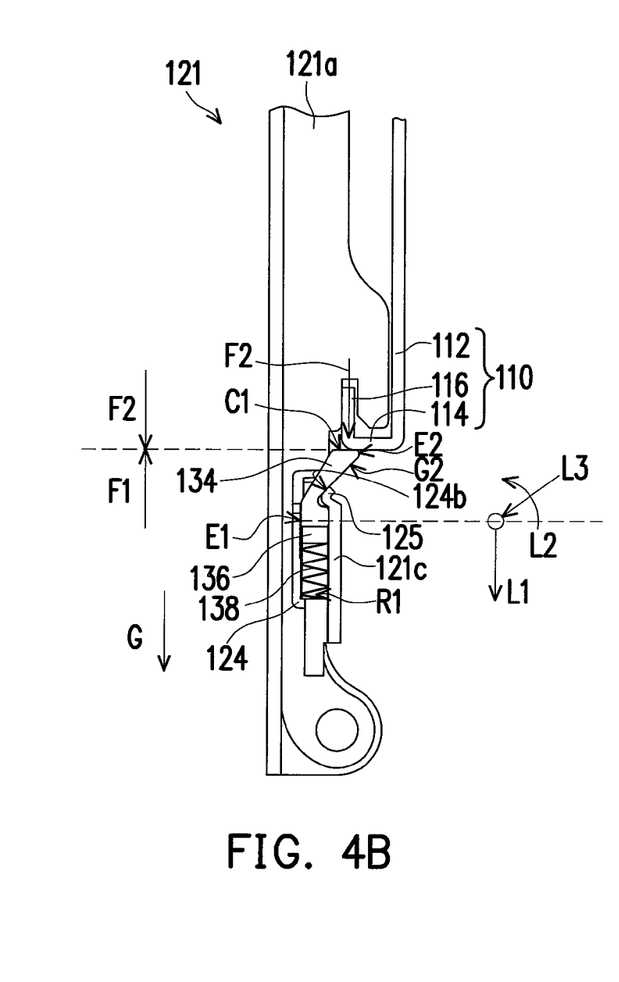
Figure 4C:
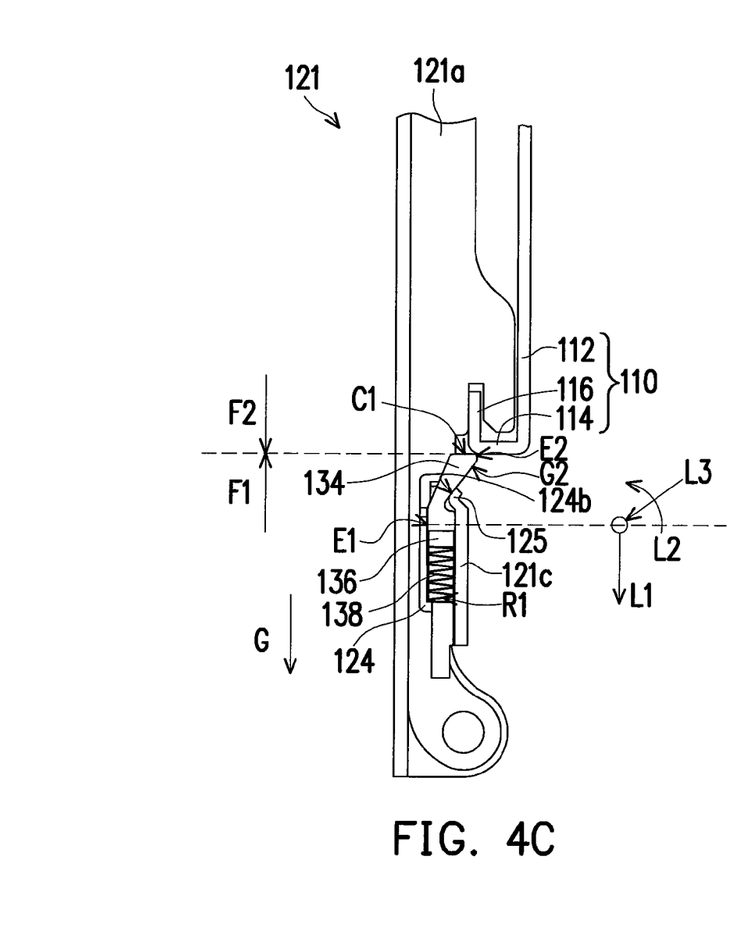
Figure 4D:
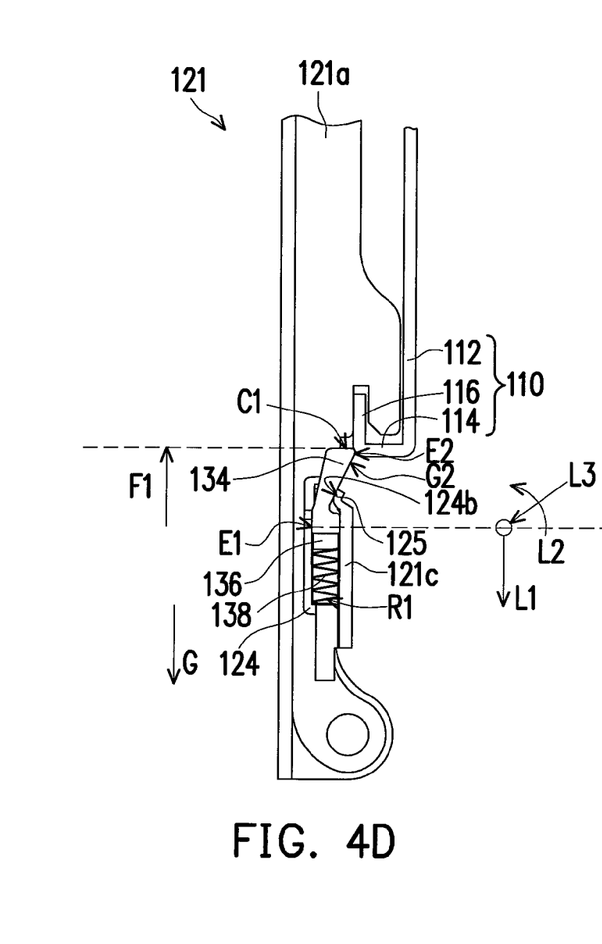
Figure 4E:
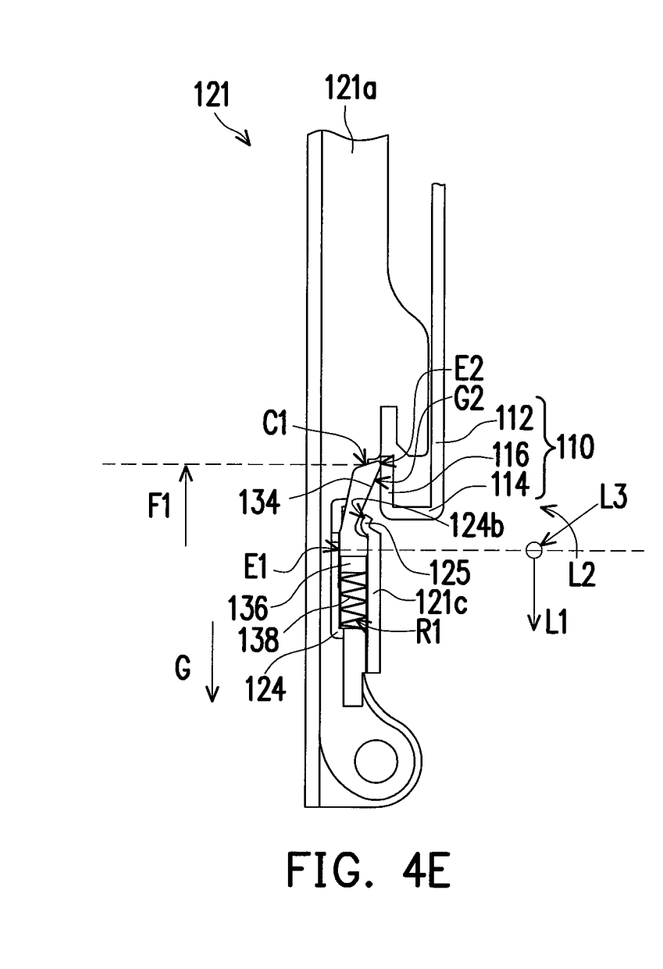

Next, please refer to FIG. 4B to FIG. 4D, and the figures define the direction of gravity G to be downwards, the direction opposite to the gravity G to be upwards, a movement parallel to the gravity G to be a vertical movement, a movement perpendicular to the gravity G to be a transverse movement, and draw the movement route of the locking assembly 130 on the side in order to clearly describe the motion of the relevant parts.

In an unlocking process as shown in FIG. 4A to FIG. 4C, the moving unit 136 moves along a first path L1. Since the locking unit 134 and the moving unit 136 are integral structure, and the first guiding surface U1 and the second guiding surface U2 have coincident slopes with respect to the first path L1, the moving unit 136 drives the locking unit 134 to rotate along the second path L2 and move along the third path L3 within the restriction of the limiting unit 125.

In practice, when the suspending assembly 120 and the electronic device 10 thereon are to be dismantled from the base 110, the user first applies a force F1 (in a direction opposite the gravity G) on the electronic device 10 (labeled in FIG. 1), to drive the suspending assembly 120 locked onto the electronic device 10 to move in its entirety upwards relative to the base 110, causing the first slab 114 of the base 110 to press against the locking unit 134 with a reaction force F2, which in turn drives the moving unit 136. At the same time, the second end E2 of the locking unit 134 is acted by the reaction force F2, but due to the slanting of the slopes of the first guiding surface U1 and the second guiding surface U2 with respect to the first path L1 (also the direction of the gravity G), even though the locking unit 134 is subject to the reaction force F2 which is parallel to the gravity G, the structure of the limiting unit 125 restricts the movement of the locking unit 134 to the third path L3, wherein the first path L1 and the third path L3 are straight line segments with an angle therebetween.

It is worth mentioning here that the locking unit 134 of this embodiment is flexible, and the moving unit 136 is restricted by the accommodating space R1 and only moves parallel to the gravity G. Therefore, the moving unit 136 is subject to pushing by the locking unit 134 and moves along the first path L1, and the locking unit 134 rotates along the second path L2 as moving along the third path L3, that is, the first end E1 of the locking unit 134 moves into the accommodating space R1 along with the moving unit 136, and the second end (E2), as moving along the third path L3 towards the accommodating space R1, also rotates along the second path L2 with respect to the first end E1. As shown in FIG. 4A to FIG. 4C, the angle between the direction of the gravity G and the geometric straight line formed by the first end E1 and the second end E2 of the locking unit 134 increases as the locking unit 134 and the moving unit 136 move downward in the direction of the gravity (G).

Please refer to the unlocking process in FIG. 4C to FIG. 4F. In this embodiment, the locking assembly 130 further includes an elastic unit 138 disposed inside the accommodating space R1 and is attached between the moving unit 136 and the cover 124. This elastic unit 138 constantly drives the moving unit 136 to move along a path reverse to the first path L1 (namely the direction reverse to the gravity G). In this embodiment, when the moving unit 136 moves along the first path L1, the second end E2 of the locking unit 134 moves from the first slab 114 to the arc-shaped slab 115, and the moving unit 136 causes the elastic unit 138 to deform (the spring being compressed as shown in FIG. 4A to FIG. 4D). When the second end E2 moves to the arc-shaped slab 115, that is, when the second end E2 moves away from the first slab 114 and eliminates the interference between the locking surface C1 and the first slab 114, the moving unit 136 moves along the reverse path of the first path L1 due to the elastic restoring force of the elastic unit 138, so as to drive the second end E2 to move away from the accommodating space R1. In other words, the elastic force of the elastic unit 138 moves the moving unit 136 against the direction of the gravity G, and in conjunction drives the locking unit 134 to move away from the accommodating space R1.

The second end E2 of the locking unit 134 moves from the arc-shaped slab 115 to the second slab 116 by the elastic unit 138. At the same time, since the second end E2 is restricted by the second slab 116, the locking unit 134 still presses against the second slab 116 and causes the second end E2 to continue rotating along the second path L2 with respect to the first end E1, finally resulting in the separation of the first guiding surface U1 and the second guiding surface U2. Accordingly, the user can move the electronic device 10 and the suspending assembly 120 locked thereon away from the base 110 along the fourth path L4.

On the other hand, please refer to FIG. 1 and FIG. 3 again. The locking assembly 130 further includes a drawstring 131 tied to the moving unit 136 and hanging and extending from the accommodating space R1 to be exposed outside the electronic device 10. Therefore, the suspending apparatus 100 of this embodiment provides another operation mode for dismantling, in which the user pulls the drawstring 131 to drive the moving unit 136 to move along the first path L1, which has the same effect of applying the force F1 on the electronic device 10.

Figure 4F:
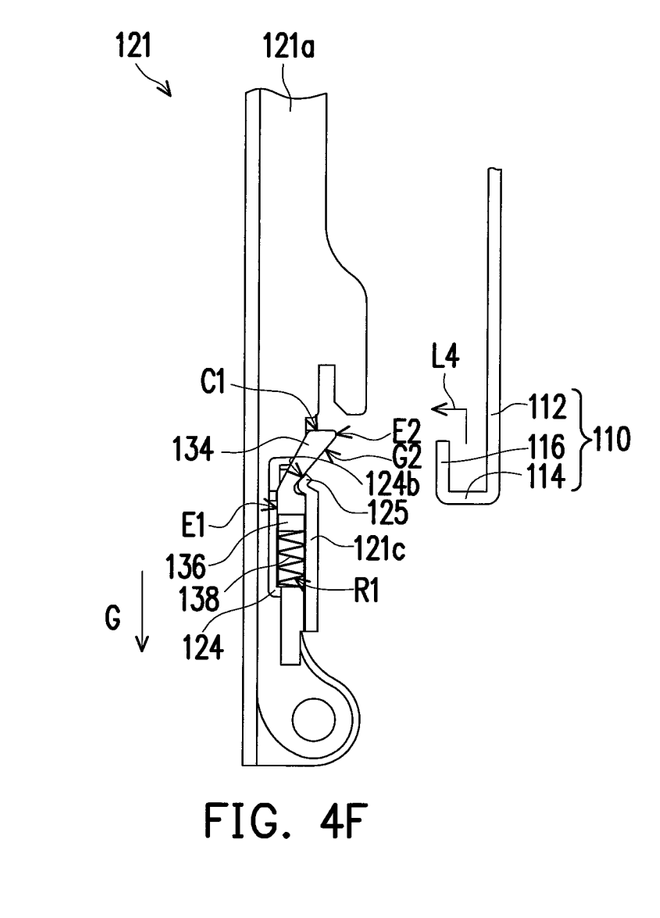

Correspondingly, when the user intends to suspend the electronic device 10 and the suspending assembly 120 back on the wall surface 20, a reversal of operations in the above-mentioned FIG. 4A to FIG. 4F and the corresponding descriptions can complete the assembling process. In a locking process, the user needs to move the suspending assembly 120 along the reverse path of the fourth path L4 towards the base 110. It must be mentioned that the mode of motion along the fourth path L4 of this embodiment (as shown in FIG. 4F) includes a transverse movement and a vertical movement. Therefore, during assembling, the user first makes the second slab 116 press against the locking unit 134 through a transverse movement in the reverse direction of the fourth path L4, causing the second end E2 to rotate along the second path L2 relative to the first end E1, thereby allowing the hook part of the hook 121a to be locked on the slot structure formed by the bearing plate 112, the first slab 114, the arc-shaped slab 115 and the second slab 116. Also, at the same time, the locking unit 134 is in a deformed state due to its elasticity.

Next, the user moves the hook 121a downward through a vertical movement in the reverse direction of the fourth path L4 until the second end E2 of the locking unit 134 moves from the second slab 116 to the arc-shaped slab 115, and due to the elastic restoring effect of the locking unit 134, the second end E2 rotates along the reverse path of the second path L2 with respect to the first end E1, further causing the second end E2 to move from the arc-shaped slab 115 to the first slab 114, such that when the hook part of the hook 121a is linked onto the slot structure, the locking surface C1 is also in a state of interference with the first slab 114. With this, the locking assembly 130 completes the locking process of the suspending assembly 120 with the base 110.

Based on the above, compared to the known dismantling and assembling process which requires a series of repetitive removal of locking parts, the suspending apparatus 100 of the embodiment of the invention dismantles and assembles the electronic device 10 with a faster and more convenient method via the characteristics of the simple structure, relative configuration, and process of motion between the relevant parts of the locking assembly 130.

In summary of the above, in the suspending apparatus of the invention, the path of motion created by the limiting unit, the locking unit and the moving unit, and the mutually corresponding guiding surface structure allow the suspending assembly, before and after the movement process relative to the base, to lock or unlock the suspending assembly and the base. Thereby, the user can assemble or dismantle the electronic device onto or from the wall surface in a convenient and fast manner.

Although the invention is disclosed in the embodiments above, they are not intended to limit the scope of the invention. Any person skilled in the art can, without departing from the spirit and scope of the invention, apply modifications and changes to the invention. Therefore, the protection scope of the invention is subject to the appended claims.

What is claimed is:

1. A suspending apparatus, for suspending an electronic device on a surface, the suspending apparatus comprising:
   a base fixed onto the surface;

a suspending assembly assembled to the electronic device and detachably suspended on the base, the suspending assembly comprising a limiting unit, a pair of hooks parallel to each other and a connecting board connecting the pair of hooks, wherein the limiting unit and the connecting board are an integral structure;

a locking assembly movably disposed on the connecting board of the suspending assembly, and the locking assembly comprising:

a locking unit movably and selectively leaning against the limiting unit, wherein the locking unit is locked to the base when the suspending assembly is suspended on the base, and the suspending assembly is removed from the base when the locking unit is unlocked from the base;

a moving unit connected to an end of the locking unit, wherein in an unlocking process, the moving unit moves along a first path according to an applied force and drives the locking unit, and the locking unit is restricted by the limiting unit and simultaneously rotates along a second path and moves along a third path, such that the locking unit moves away from the base, wherein an angle is formed between the first path and the third path; in a locking process, the suspending assembly moves with respect to the base, such that the locking unit is pressed and released by the base and moves back along the second path to lock to the base, wherein the limiting unit comprises a first guiding surface, and the locking unit comprises a first end and a second end opposite to each other and a second guiding surface, wherein the first end is connected to the moving unit, the second end is for locking to the base, wherein the first guiding surface and the second guiding surface have coincident slopes with respect to the first path, the second guiding surface is situated between the first end and the second end, and when the locking unit rotates along the second path, the second end rotates along the second path with respect to the first end.

2. The suspending apparatus of claim 1, wherein at least a portion of the first path is parallel to a direction of gravity.

3. The suspending apparatus of claim 1, wherein the third path is parallel to the first guiding surface and the second guiding surface.

4. The suspending apparatus of claim 1, wherein the first path and the third path are each a straight line segment.

5. The suspending apparatus of claim 1, wherein the suspending assembly further comprises a cover assembled onto the connecting board defining an accommodating space therein, the moving unit and the first end are situated inside the accommodating space, the second end protrudes upwards from the accommodating space and presses against the base, and when the moving unit moves along the first path, the second end rotates along the second path with respect to the first end and simultaneously moves towards the accommodating space along the third path with respect to the limiting unit.

6. The suspending apparatus of claim 5, wherein the locking assembly further comprises an elastic unit disposed inside the accommodating space and pressed between the moving unit and the cover, the elastic unit constantly drives the moving unit to move along a reverse path of the first path, in order to drive the second end to move away from the accommodating space.

7. The suspending apparatus of claim 6, wherein the base comprises a bearing plate, an arc-shaped slab, a first slab and a second slab, the first slab and the second slab fall on different geometric planes and are connected by the arc-shaped slab therebetween, the bearing plate is fixed onto the surface, and a part of the first slab away from the second slab is connected to the bearing plate, wherein when the moving unit moves along the first path and drives the second end to rotate along the second path with respect to the first end, and the second end moves along the third path with respect to the limiting unit, the second end moves from the first slab to the arc-shaped slab, and the moving unit elastically deforms the elastic unit; and when the elastic unit drives the moving unit to move along the reverse path of the first path, the second end moves from the arc-shaped slab to the second slab, such that the second end rotates along the second path with respect to the first end.

8. The suspending apparatus of claim 7, wherein in the unlocking process, the suspending assembly is subject to an applied force and moves along a fourth path with respect to the base, such that the pair of hooks are dismantled from the base, and in the movement process of the suspending assembly, the second end moves from the first slab across the arc-shaped slab to the second slab and moves away from the second slab as the suspending assembly moves away from the base.

9. The suspending apparatus of claim 8, wherein in the locking process, the suspending assembly is subject to an applied force and moves along a reverse path of the fourth path with respect to the base, such that the second end rotates along the second path with respect to the first end and moves from the second slab to the arc-shaped slab, and after the suspending assembly moves along the reverse path of the fourth path with respect to the base, the second end still rotates along the reverse path of the second path with respect to the first end, such that the second end moves from the arc-shaped slab to the first slab and presses against the first slab.

10. A suspending apparatus, for suspending an electronic device on a surface, the suspending apparatus comprising:

a base fixed onto the surface;

a suspending assembly assembled to the electronic device and detachably suspended on the base, the suspending assembly comprising a first guiding surface and an accommodating space;

a locking unit movably installed partially inside the accommodating space and comprising a locking surface and a second guiding surface which are adjacent to each other, the second guiding surface being parallel to the first guiding surface; and an elastic unit situated inside the accommodating space and pressed between the suspending assembly and the locking unit, wherein the elastic unit constantly drives the locking surface to press against the base, and when the suspending assembly is subject to an applied force and is removed from the base, the locking unit moves with respect to the suspending assembly and the base via the mutual coordination between the first guiding surface and the second guiding surface to allow the locking surface to move away from the base; and when the suspending assembly is subject to an applied force and is assembled onto the base, the base presses against the locking unit and makes the locking surface press against the base after the locking unit partially elastically defoii-iis and restores in shape.

11. The suspending apparatus of claim 10, wherein the suspending assembly comprises a pair of hooks parallel to each other and a connecting board connecting between the pair of hooks, the pair of hooks are suspended on the base, and the connecting board has the first guiding surface.

12. The suspending apparatus of claim 11, wherein the suspending assembly further comprises a cover assembled on the connecting board to form the accommodating space therein, the locking unit comprises a first end and a second end, the first end is situated inside the accommodating space, the second end is situated outside the accommodating space, and the locking surface and the second guiding surface are situated on the second end, wherein when the suspending assembly is subject to an applied force and is removed from the base, the first end drives the second end to move towards the accommodating space and deforms the elastic unit, and in the movement process, the second end rotates with respect to the first end via the coordination of the first guiding surface and the second guiding surface; when the suspending assembly is subject to an applied force and is assembled onto the base, the base presses against the locking unit to rotate the second end with respect to the first end until the locking surface presses against the base.

13. The suspending apparatus of claim 12, wherein the base comprises a bearing plate, an arc-shaped slab, a first slab and a second slab, the first slab and the second slab are on different geometric planes and are connected by the arc-shaped slab therebetween, the bearing plate is fixed on the surface, a part of the first slab away from the second slab is connected to the bearing plate, wherein when the suspending assembly is suspended on the base, the locking surface presses against the first slab; when the suspending assembly is subject to an applied force and is removed from the base, the suspending assembly moves with respect to the base, such that the first slab presses against the locking surface and drives the locking unit to move; when the second end moves toward the accommodating space, the second end moves from the first slab to the arc-shaped slab, and after the locking surface moves away from the first slab, the elastic unit elastically drives the second end to move from the arc-shaped slab to the second slab; and when the suspending assembly is subject to an applied force and assembled onto the base, the second end sequentially moves from the second slab across the arc-shaped slab to the first slab.

14. A suspending apparatus, for suspending an electronic device on a surface, the suspending apparatus comprising:
a base fixed onto the surface;
a suspending assembly assembled to the electronic device and detachably suspended on the base, the suspending assembly comprising a limiting unit, a pair of hooks parallel to each other and a connecting board connecting the pair of hooks, wherein the limiting unit and the connecting board are an integral structure;
a locking assembly disposed on the suspending assembly and movably disposed on the connecting board, and the locking assembly comprising:
a locking unit movably and selectively leaning against the limiting unit, wherein the locking unit is pressed and deformed by the base to lock to the base when the suspending assembly is suspended on the base, and the suspending assembly is removed from the base when the locking unit is pressed and deformed by the base to unlock from the base;
a moving unit connected to an end of the locking unit so that the locking unit and the moving unit are an integral structure, wherein in an unlocking process, the moving unit moves along a first path according to an applied force and drives the locking unit, and the locking unit is restricted by the limiting unit and simultaneously rotates along a second path and moves along a third path, such that the locking unit moves away from the base, wherein an angle is formed between the first path and the third path; in a locking process, the suspending assembly moves with respect to the base, such that the locking unit is pressed and released by the base and moves back along the second path to lock to the base.

15. The suspending apparatus of claim 14, wherein the limiting unit comprises a first guiding surface, and the locking unit comprises a first end and a second end opposite to each other and a second guiding surface,
wherein the first end is connected to the moving unit, and the second end is for locking to the base,
wherein the first guiding surface and the second guiding surface have coincident slopes with respect to the first path,
wherein the second guiding surface is situated between the first end and the second end, and when the locking unit rotates along the second path, the second end rotates along the second path with respect to the first end,
wherein at least a portion of the first path is parallel to a direction of gravity, the third path is parallel to the first guiding surface and the second guiding surface, and the first path and the third path are each a straight line segment.

16. The suspending apparatus of claim 15, wherein the suspending assembly comprises a pair of hooks parallel to each other, a connecting board connecting the pair of hooks, and a cover assembled onto the connecting board defining an accommodating space therein,
wherein the locking assembly is movably disposed on the connecting board, and the limiting unit and the connecting board are an integral structure,
wherein the moving unit and the first end are situated inside the accommodating space, the second end protrudes upwards from the accommodating space and presses against the base, and when the moving unit moves along the first path, the second end rotates along the second path with respect to the first end and simultaneously moves towards the accommodating space along the third path with respect to the limiting unit,
wherein the locking assembly further comprises an elastic unit disposed inside the accommodating space and pressed between the moving unit and the cover, the elastic unit constantly drives the moving unit to move along a reverse path of the first path, in order to drive the second end to move away from the accommodating space.

17. The suspending apparatus of claim 16, wherein the base comprises a bearing plate, an arc-shaped slab, a first slab and a second slab, the first slab and the second slab fall on different geometric planes and are connected by the arc-shaped slab therebetween, the bearing plate is fixed onto the surface, and a part of the first slab away from the second slab is connected to the bearing plate, wherein when the moving unit moves along the first path and drives the second end to rotate along the second path with respect to the first end, and the second end moves along the third path with respect to the limiting unit, the second end moves from the first slab to the arc-shaped slab, and the moving unit elastically deforms the elastic unit; and when the elastic unit drives the moving unit to move along the reverse path of the first path, the second end moves from the arc-shaped slab to the second slab, such that the second end rotates along the second path with respect to the first end.

18. The suspending apparatus of claim 16, wherein in the unlocking process, the suspending assembly is subject to an applied force and moves along a fourth path with respect to the base, such that the pair of hooks are dismantled from the base, and in the movement process of the suspending assembly, the second end moves from the first slab across the arc-shaped slab to the second slab and moves away from the second slab as the suspending assembly moves away from the base, wherein in the locking process, the suspending assembly is subject to an applied force and moves along a reverse path of the fourth path with respect to the base, such that the second end rotates along the second path with respect to the first end and moves from the second slab to the arc-shaped slab, and after the suspending assembly moves along the reverse path of the fourth path with respect to the base, the second end still rotates along the reverse path of the second path with respect to the first end, such that the second end moves from the arc-shaped slab to the first slab and presses against the first slab.

\* \* \* \* \*